Dec. 29, 1953   G. R. BIDDINGER ET AL   2,663,899
DEVICE FOR CLEANING POULTRY GIZZARDS OR THE LIKE
Original Filed July 22, 1950   2 Sheets-Sheet 1
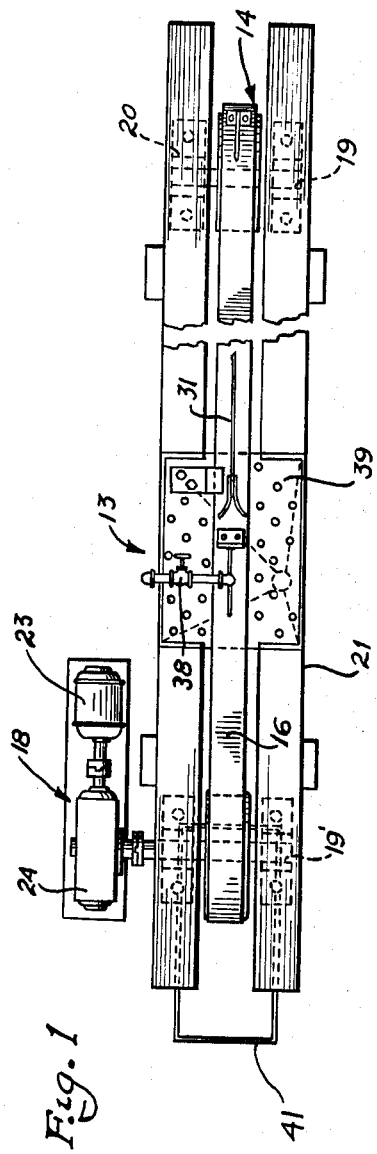
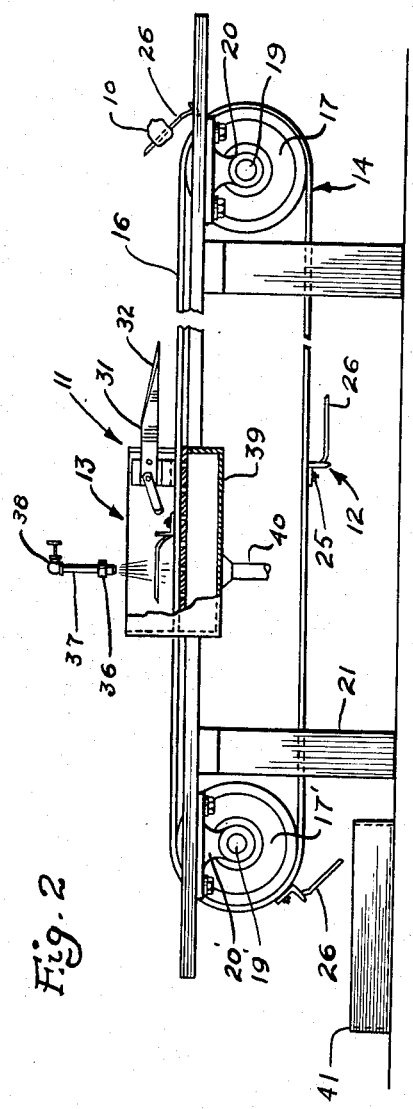
INVENTOR.
Guy R. Biddinger
Carl H. Koonz
BY   R. G. Story
ATTORNEY

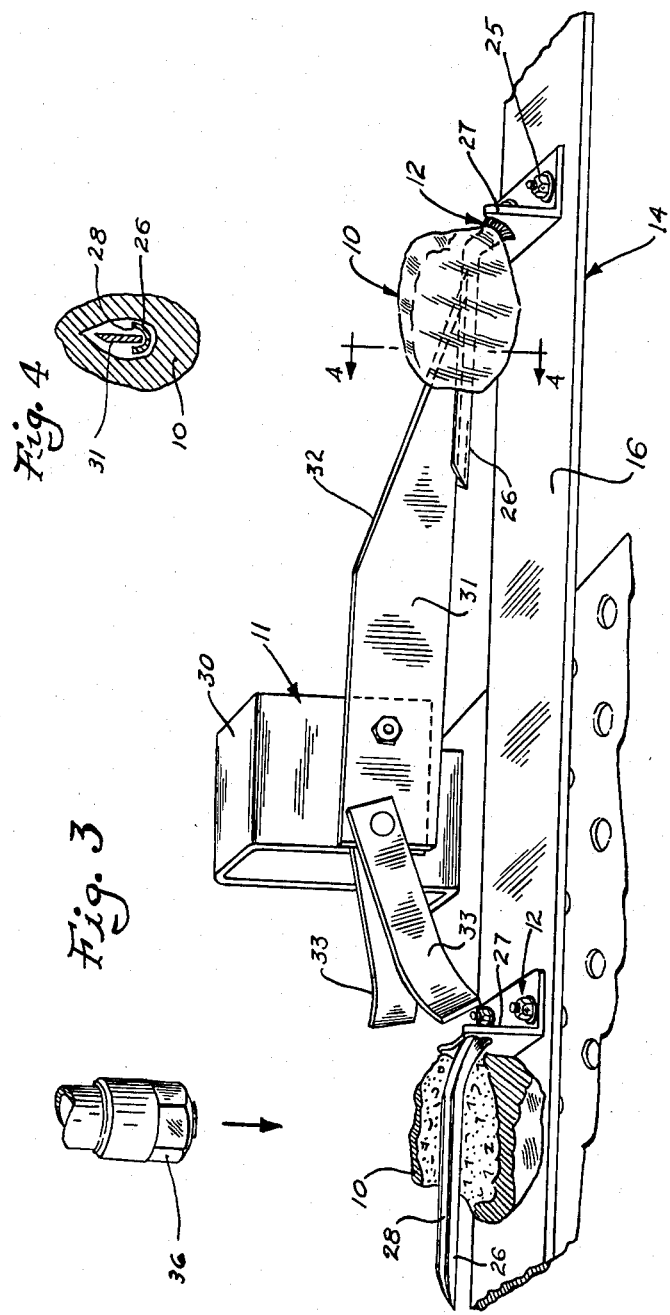

Patented Dec. 29, 1953

2,663,899

UNITED STATES PATENT OFFICE 2,663,899

DEVICE FOR CLEANING POULTRY GIZZARDS OR THE LIKE

Guy R. Biddinger, Bellwood, and Carl H. Koonz, Chicago, Ill., assignors to Swift & Company, Chicago, Ill., a corporation of Illinois Original application July 22, 1950, Serial No. 175,412. Divided and this application February 19, 1952, Serial No. 272,332

12 Claims. (Cl. 17—11)

The present invention relates to an apparatus for use in the opening and cleaning of poultry gizzards or the like.

In the dressing of poultry on a commercial scale, particularly poultry which is to be cut up before distribution, it is desirable that each portion of the bird be completely prepared for cooking. The housewife is much more likely to buy a product which merely need be cooked than she is to buy one which requires additional processing before the cooking operation can be started. To this end, the gizzards of the birds are cut open and the contents and the inner lining of the gizzard removed before it is marketed. As a matter of fact, this practice has become so prevalent that it has come to be accepted on the part of the housewives and they possibly would overlook performing the step themselves should they buy a bird which had not been so dressed.

The common practice has been to perform the necessary operations in the cleaning and preparation of poultry gizzards solely by hand. A principal object of the present invention is to provide an apparatus whereby the opening and cleaning of the gizzard may be easily and quickly performed. A particular feature of the present invention is its adaptability for continuous machine operation. Through the use of the present invention for opening and washing the gizzards the production of prepared poultry gizzards may be greatly increased and the unit preparation cost substantially reduced.

Additional objects and advantages of the invention include an apparatus which is low in first cost, which is readily operable by inexperienced labor, which requires little maintenance, and which is kept clean and sanitary without undue trouble or difficulty.

Additional objects and advantages will become apparent from the following description taken in conjunction with the drawings, in which:

Fig. 1 is a plan view of an embodiment of the present invention;

Fig. 2 is a side elevation of the embodiment of Fig. 1, with a portion thereof broken away;

Fig. 3 is an enlarged perspective view of the opening head of the embodiment of Figs. 1 and 2; and Fig. 4 is a section taken at line 4—4 of Fig. 3 showing the gizzard, pale and knife only.

In the embodiment illustrated in Figs. 1 through 3, the poultry gizzards 10 are transported to an opening head, generally 11, by means of a carrier, generally 12. After the gizzards are opened they are then transported through the washer, generally 13, by a conveyor, generally 14, where the contents of the gizzards are disposed of and the gizzards thoroughly cleaned.

Referring to Figs. 1 and 2, the conveyor 14 includes a belt 16 of a suitable material, preferably one which is impervious to the action of water or the chemicals which may be involved. The belt 16 is rotated about a pair of pulleys 17, one of which is driven by a suitable power means, generally 18.

The axles 19 and 19' of pulleys 17 and 17' are journalled in bearings 20 and 20', respectively, attached to frame 21. Power means 18 consists of an electric motor 23 and a speed reducer 24. The speed of the belt, and therefore the amount of speed reduction required, will be determined by the manner of loading the machine with the gizzards to be opened as will hereinafter be explained. Generally speaking, the speed will be quite low.

Each of carriers 12 includes a pale 26 attached to belt 16 by means of a bracket 27. One leg of the angular bracket 27 is bolted to the belt 16 by means of bolts 25 as illustrated in Fig. 3. The outwardly-projecting leg of bracket 27 also forms an abutment for the gizzards on pale 26 as will be hereinafter described. To increase the abutment area, the outwardly-projecting legs of bracket 27 may have portions extending beyond the point of attachment between the pale 26 and the bracket 27 as illustrated at 29 (Fig. 3).

Each pale 26 is formed with a longitudinal groove 28 therein on the side thereof away from the conveyor 14 (as best seen in Fig. 4). The groove is sufficiently large to receive at least a portion of the lower edge of the gizzard-cutting knife.

Opening head 11 includes a mounting bracket 30 attached to frame 21 and supporting a knife 31 along the path traversed by pales 26. The knife 31 is pointed and the edge 32 thereof which faces the approaching gizzards is sharpened as illustrated in Fig. 3. The edge 32 slopes upwardly a sufficient distance to be well above the top of the gizzards carried on pale 26. The projecting point of knife 31 is positioned to be received within the groove 28 in pale 26.

Attached to the rearward end of knife 31 are a pair of extending wings 33 to spread the sides of the gizzards as they are cut by knife 31. Referring particularly to Figs. 1 and 2, the washer 13 includes a water spray head 36 connected to a suitable water supply by means of a pipe 37 having a control valve 38 therein. An enclosure such as pan 39 is utilized to catch the water and material removed from the gizzards and to conduct them to a suitable disposal point through a drainpipe 40.

The method of opening the gizzards is to impale the gizzards 10 on carrier 12 and then to slip the knife through the gizzard above the carrier and by a movement of the knife edge relative to the carrier to cut the portion of the gizzard above the carrier. In the illustrated embodiment, this is achieved by means of the tapered edge 32 of knife 31. The pale 26 provides an opening through two opposite walls of the gizzard 10, and the portions of those walls above the pale are cut by inserting the knife 31 into groove 28 in the pale 26, with the knife blade longitudinally parallel to the groove, and sliding the edge of the knife through the portion of the gizzard above said opening. The abutment formed by the outstanding leg of bracket 27 and ear portions 29 acts as a pusher member to move the gizzard supported on pale 26 into the knife as the carrier 12 is moved by belt 16.

The tapered edge of the knife has the effect of moving the knife edge away from the pale as the knife and the pale move longitudinally toward one another. In addition, the flat sides of the knife afford some transverse support to the gizzard.

The point of insertion of the pale through the gizzard is preferably adjacent the inside of the bottom wall of the gizzard as illustrated in Fig. 4.

In this way the cut in the gizzard is sufficiently large to permit the complete opening and cleaning of the gizzard.

In some instances the sides of the gizzard, after the gizzard has been severed by knife 31, will fall away from about pale 26 and the sides of the gizzard will be supported on belt 16. If this does not occur, the separating of the sides of the gizzard will be performed by means of wings 33. After the gizzard has been laid out flat on conveyor 14 it is cleaned by passing through washer 13.

The gizzards may be loaded onto pales 26 by an operator. The operator merely stands at the right-hand end of the conveyor in Figs. 1 and 2 and as the pales come around the right-hand pulley 17 the gizzards may be slipped thereover. The movement of the pales around pulley 17 is such that the pales stand out away from the belt 16 a substantially greater distance than is normally true inasumch as they tend to assume a tangential position with respect to the pulley.

After the gizzards pass through washer 13 they are carried along the conveyor to the end thereof whereupon they drop into a bin 41 positioned under the pulley 17.

The foregoing description is for the purpose of complying with 35 U. S. C. 112, and we do not desire to be limited to the exact details shown and described, for obvious modifications will be apparent to those skilled in the art to which this most nearly appertains, and such modifications may be made without departing from the spirit of the invention.

The present application is a division of our prior application Serial No. 175,412 filed July 22, 1950.

We claim:

1. An apparatus for opening poultry gizzards or the like, including a plurality of slender pales each having longitudinal grooves therein and adapted to be inserted through the gizzards, a pusher member associated with each of said pales to provide an abutment for the gizzards placed thereon, conveyor means to move each of said pales and associated pusher members along a given path at spaced intervals, with said grooves parallel to the line of movement, a pointed knife, the pointed end of which is receivable within said groove with the knife edge disposed away from the pale, and means to support said knife along said path in a position in which the knife is substantially parallel to the grooves in the pales, with the knife point toward the approaching pales and position to be received in said grooves with the edge of the knife projecting outwardly from said pales whereby the knife edge will be pushed through and will sever the walls of the gizzard between the groove and a side of the gizzard.

2. An apparatus for cleaning the gizzards of poultry or the like, including a plurality of slender pales each having longitudinal grooves therein and adapted to be inserted through the gizzards, a pusher member associated with each of said pales to provide an abutment for the gizzards placed thereon, conveyor means to move each of said pales and associated pusher members along a given path at spaced intervals, with said grooves parallel to the line of movement, a pointed knife, the pointed end of which is receivable within said groove with the knife edge disposed away from the pale, means to support said knife along said path in a position in which the knife is substantially parallel to the grooves in the pales with the knife point toward the approaching pales and positioned to be received in said grooves with the edge of the knife projecting outwardly from said pales whereby the knife edge will be pushed through and will sever the walls of the gizzard between the groove and the side of the gizzard, and opening and washing means to spread the severed walls of the gizzard and to flush the contents from the interior of the gizzard.

3. An apparatus for opening and cleaning poultry gizzards or the like, including a frame, a pair of shafts mounted on said frame, conveyor support means mounted on each of said shafts, conveyor means trained for movement about said conveyor support means, a gizzard holder secured to said conveyor means, said holder including an impaling means adapted to be inserted through the gizzard to retain the same, knife means mounted on said frame adjacent the path of movement of said impaling means and adapted to cut open the gizzard on said impaling means.

4. An apparatus as set forth in claim 3 including gizzard washing means mounted on said frame in alignment with said knife for washing said gizzard.

5. An apparatus for opening poultry gizzards or the like, said apparatus including an elongated pale means adapted to have a gizzard placed thereon, knife means operatively associated with said pale means and having a cutting edge, said knife means being positioned with at least a portion of said cutting edge in proximity to a side of said pale means, and driving means operatively connected to one of said means to move said one of said means linearly with respect to the other of said means to effect splitting of the gizzard.

6. An apparatus for opening poultry gizzards or the like, said apparatus including an elongated pale means adapted to have a gizzard placed thereon, said pale means having a longitudinal groove therein, knife means operatively associated with said pale means and having a cutting edge, said knife means being positioned with at least a portion of said cutting edge in proximity to a side of said pale means, said knife means being positioned with an edge of the knife means within said groove, and driving means operatively connected to one of said means to move said one of said means linearly with respect to the other of said means to effect splitting of the gizzard.

7. An apparatus for opening poultry gizzards or the like, said apparatus including an elongated pale means adapted to have a gizzard placed thereon, said pale means having one pointed end and a pusher adjacent the other end to provide an abutment for the gizzards slipped over said pointed end, knife means operatively associated with said pale means and having a cutting edge, said knife means being positioned with at least a portion of said cutting edge in proximity to a side of said pale means, and driving means operatively connected to one of said means to move said one of said means linearly with respect to the other of said means to effect splitting of the gizzard.

8. An apparatus for opening poultry gizzards or the like, said apparatus including an elongated pale means adapted to have a gizzard placed thereon, said pale means having a longitudinal groove therein, said pale means having one pointed end and a pusher adjacent the other end to provide an abutment for the gizzards slipped over said pointed end, knife means operatively associated with said pale means and having a cutting edge, said knife means being positioned with at least a portion of said cutting edge in proximity to a side of said pale means, said knife means being positioned with an edge of the knife means within said groove, and driving means operatively connected to one of said means to move said one of said means linearly with respect to the other of said means to effect splitting of the gizzard.

9. An apparatus for opening poultry gizzards or the like, said apparatus including an elongated pale means adapted to have a gizzard placed thereon, knife means operatively associated with said pale means and having a cutting edge, said knife means being positioned with at least a portion of said cutting edge in proximity to a side of said pale means, and driving means including a conveyor attached to said pale means to move said pale means linearly with respect to said knife means to effect splitting of the gizzard.

10. An apparatus for opening poultry gizzards or the like, said apparatus including an elongated pale means adapted to have a gizzard placed thereon, said pale means having a longitudinal groove therein, knife means operatively associated with said pale means and having a cutting edge, said knife means being positioned with at least a portion of said cutting edge in proximity to a side of said pale means, said knife means being positioned with an edge of the knife means within said groove, and driving means including a conveyor attached to said pale means to move said pale means linearly with respect to said knife means to effect splitting of the gizzard.

11. An apparatus for opening poultry gizzards or the like, said apparatus including an elongated pale means adapted to have a gizzard placed thereon, said pale means having one pointed end and a pusher adjacent the other end to provide an abutment for the gizzards slipped over said pointed end, knife means operatively associated with said pale means and having a cutting edge, said knife means being positioned with at least a portion of said cutting edge in proximity to a side of said pale means, and driving means including a conveyor attached to said pale means to move said pale means linearly with respect to said knife means to effect splitting of the gizzard.

12. An apparatus for opening poultry gizzards or the like, said apparatus including an elongated pale means adapted to have a gizzard placed thereon, said pale means having a longitudinal groove therein, said pale means having one pointed end and a pusher adjacent the other end to provide an abutment for the gizzards slipped over said pointed end, knife means operatively associated with said pale means and having a cutting edge, said knife means being positioned with at least a portion of said cutting edge in proximity to a side of said pale means, said knife means being positioned with an edge of the knife means within said groove, and driving means including a conveyor attached to said pale means to move said pale means linearly with respect to said knife means to effect splitting of the gizzard.

GUY R. BIDDINGER.
CARL H. KOONZ.

References Cited in the file of this patent

UNITED STATES PATENTS

| Number | Name | Date |
| --- | --- | --- |
| 1,687,663 | Goldfinger | Oct. 16, 1928 |
| 2,237,203 | Swanson | Apr. 1, 1941 |
| 2,455,675 | Hawk | Dec. 7, 1948 |